United States Patent

Spanjersberg

[15] 3,649,814
[45] Mar. 14, 1972

[54] OCTONAL CODE READER

[72] Inventor: Arie Adriaan Spanjersberg, Leiderdorp, Netherlands;

[73] Assignees: De Staat der Nederlanden, Ten Deze Vertegenwoordigd Door de

[22] Filed: Jan. 5, 1970

[21] Appl. No.: 741

[30] Foreign Application Priority Data

Jan. 3, 1969 Netherlands..........................6900168

[52] U.S. Cl...............235/61.11 E, 250/219 D, 340/146.3 Z
[51] Int. Cl. ....................G01n 21/30, G06k 7/10, G06k 4/04
[58] Field of Search................235/61.11, 61.115; 340/146.3; 250/219

[56] References Cited

UNITED STATES PATENTS

| 3,104,369 | 9/1963 | Rabinow et al.............340/146.3 MO |
| 3,484,587 | 12/1969 | Rchardson......................235/61.11 E |
| 3,243,776 | 3/1966 | Abbott et al....................340/146.3 R |

FOREIGN PATENTS OR APPLICATIONS

| 1,168,235 | 10/1969 | Great Britain............235/61.115 UX |

Primary Examiner—Maynard R. Wilbur
Assistant Examiner—Thomas J. Sloyan
Attorney—Hugh Adam Kirk

[57] ABSTRACT

An octonal dot code and an apparatus for mechanically reading such code marked on documents and read through windowed envelopes for these documents. This apparatus comprises a selecting circuit for the optical scanner aligned with the dots, a clock circuit for timing the spacing of the dots, a checking circuit for determining the number of dots on each document, and circuits for processing and storing the data scanned from the dots.

11 Claims, 9 Drawing Figures

WINDOWED ENVELOPE SCANNED

PATENTED MAR 14 1972

WINDOWED ENVELOPE SCANNED

*INVENTOR.*
A. A. SPANJERSBERG
BY
*ATTORNEY*

3,649,814

OCTONAL CODE READER

RELATED APPLICATIONS

Priority Netherlands patent application Ser. No. 6900168 filed Jan. 3, 1969.

BACKGROUND AND OBJECT OF THE INVENTION

The invention relates to a system for automatically reading, by means of an optical sensing station, a code provided on documents moving past the station.

Such systems are common knowledge. The code can be formed by a combination of numerical characters which can be read automatically. In order that such characters can be read without errors, they will have to exhibit a uniform shade of black; moreover all parts of a character will have to be equally black. This requires expensive printing machines achieving a perfect fit of forme and platen. The printing machines used in practice mostly do not come up to these high requirements. Moreover, the reading machines to be used are very expensive.

Now the invention provides a system in which simple printing equipment can be used and in which the reading machine can be cheaper by a factor 100 in comparison with the above-mentioned reading machine.

SUMMARY OF THE INVENTION

The system according to the invention is so arranged that the code is formed in typewriting by a number of dots and spaces in sequence.

The system according to the invention is so elaborated that in the first position of each code pattern a dot is printed, that the logic value "1" is represented by a dot, and that the logic value "0" is represented by a space or blank followed by a dot.

An embodiment of the system according to the invention is so arranged that the representation of numbers is based on the octonal system, a code pattern being constituted by a number consisting of two octonal digits, each represented in binary code by dots and blanks, the conversion being so carried out that each code character exhibits a fixed number of dots, and that the reading device is provided with a circuit for counting and checking the number of dots in a character. The advantage of the use of dots for the code is that it permits a quick and clear discrimination between a legible and an illegible dot so that the reading machine the legibility is good or bad. Together with the fact that the code characters are protected (all characters having a constant number of dots), there is little chance that errors will arise that won't be noticed. On the other hand the present bearer has many gradations in the blackness of a numerical character and if the distinction between good and bad gradations were required, such would be much harder to make by machine. In such a case error detection also would be much more complicated. An alphabetic character has the same drawbacks, and with it also a uniform blackness is never obtained by normal printing machines.

The apparatus for reading this octonal code comprises: a scanner having two parallel rows of staggered photocells oblique to the line of dots and blanks and spaced apart a distance corresponding to the positions for two consecutive dots. These photocells are connected to a selecting device responsive to the first dot detected and blocks further response from other photocells in its row for the duration of scanning of that document. The pulse generated from the detection of this first dot is used to generate clock pulses timed according to the spacing between the dots and blanks to be read, and to start when the second row of photocells is in this first dot scanning position. Thus, the pulses from the succeeding dots detected are processed for detection as dots and blanks or absence of dots and are stored in a shift register controlled by the clock pulses. A counter circuit is also provided for checking the number of pulses or dots read on each document by which errors are indicated.

BRIEF DESCRIPTION OF THE VIEWS

The above mentioned and other features, objects and advantages and a manner of attaining them are described more specifically below by reference to an embodiment of this invention shown in the accompanying drawings, wherein:

FIG. 5 is a schematic block wiring diagram of one embodiment of a selection circuit according to this invention controlled by the outputs of the amplifiers shown in FIG. 3a;

FIG. 6 is a schematic block wiring diagram of one embodiment of the apparatus according to this invention for reading the octonal dot code shown in FIGS. 1 and 1a;

FIG. 8 shows the pulse waveforms for reading seven dots of the code of this invention produced in various parts of the circuits shown in FIGS. 3a, 5 and 7, for reading a start dot and the three dots corresponding to each of the digits "4" and "6" as shown in FIG. 1a.

DETAILED DESCRIPTION OF A PREFERRED EMBODIMENT

I THE DOT CODE AND SCANNERS

The device can automatically read postal documents, e.g., statements of giro accounts produced by a line printer and sent in window envelopes, the name and the address of the addressee being legible through the window. The line printer can also print a code pattern on the statement, so that the document can be sorted automatically.

Figure 1:
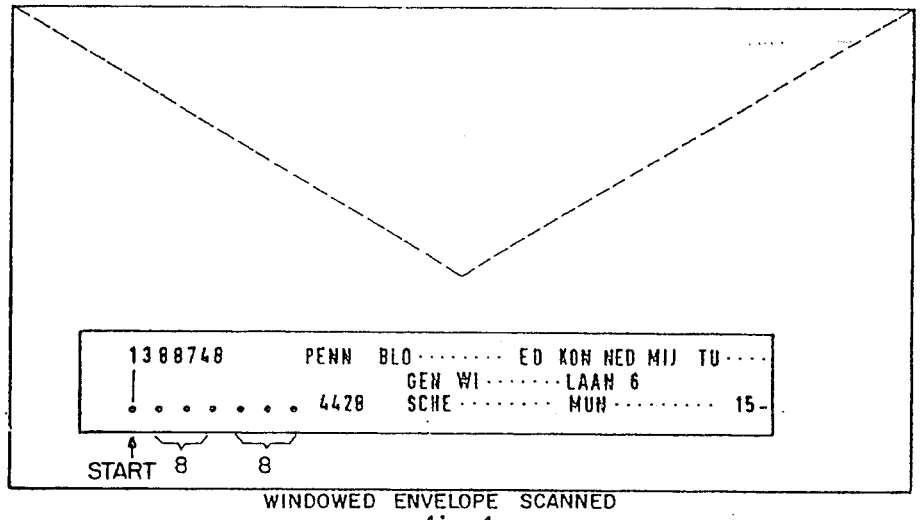
FIG. 1 is a plan view of a windowed envelope containing a post-check or giro statement showing in the lower left corner of the window a dotted octonal code to be read by the apparatus of this invention.

The text on the giro statement can be arranged as shown in FIG. 1. The coded information is visible in the left-hand bottom corner of the window. The code consists of a series of dots. Dots have been chosen in order to ensure a good printing quality. The giro statement containing the coding and the address has an ample play in the envelope. This is necessary in order that an automatic envelope filling machine can be used. This implies that the distance between the code pattern and the edges of the envelope will vary in a vertical as well as in a horizontal direction.

Figure 1A:
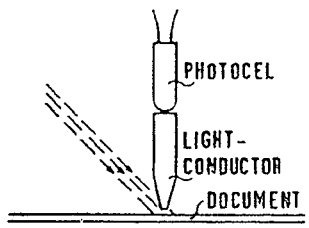
FIG. 1a is a table showing the eight different dot symbols for the eight digits of the two numbers marked in the code on the statement shown in FIG. 1.

The code is as follows:

The first position of each code pattern is occupied by a dot. (So this initial signal takes one position). The logic value "1" is represented by a dot. (So the code element "1" in a coded character takes one position). The logic value "0" is represented by a blank space followed by a dot. (So the code element "0" in a coded character takes two positions). Since six information bits are used, the described embodiment affords $2^6=64$ code patterns. The representation of numbers is based on the octonal system. Each code pattern contains two octonal digits (or $8\times8=64$). Each of these digits is coded as shown in FIG. 1a. The validity of the code can be checked now, each code pattern containing a constant number of dots, viz seven, i.e., three dots for each of the two coded characters plus the initial dot. The number of printing positions depends on the coded number, the maximum being 13, notably in the case of the coded number 88 (see the example of FIG. 1).

The device contains an optical scanning station and a circuit for handling the information obtained. The optical scanning station contains two rows of photocells; each photocell is placed behind a light conductor (FIG. 2).

Figures 2, 3:
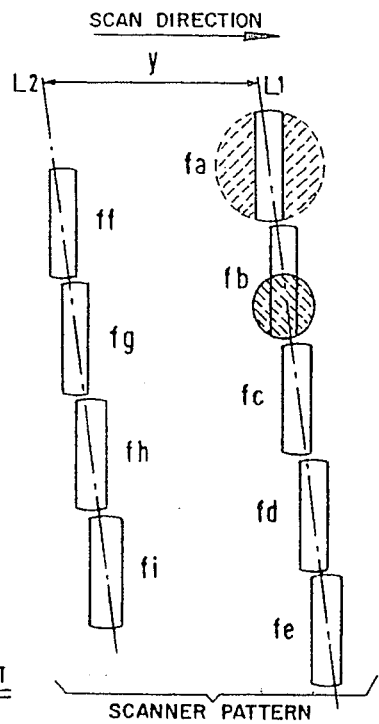
FIG. 2 is a schematic view of one photocell of the scanner showing the document being scanned and a light conductor between the document and the photocell.
FIG. 3 is a plan view of the arrangement of two slanting parallel rows of photocells used in the scanner for reading the dot code on the document shown in FIG. 1.
Figure 4:
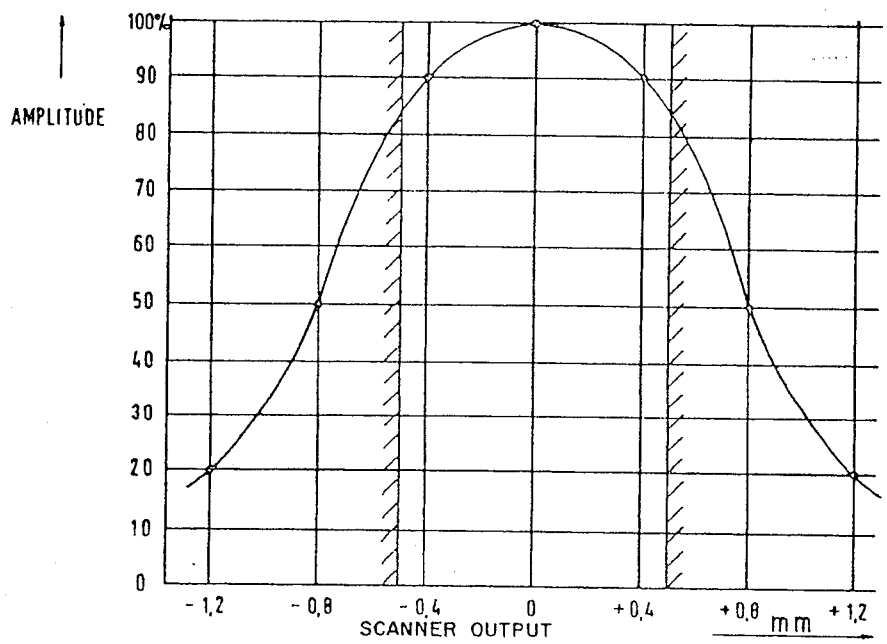
FIG. 4 is a graph of the amplitude of the signal with respect to the position of the dot from the exact center of the slot under a photocell.

The photocell and the light conductors are arranged as shown in FIG. 3. The centers of the photocells are placed on the slanting lines L1 and L2. These lines make an angle differing from 90° with the direction of movement of the document bearing the code (see arrow for scanning direction). Owing to this arrangement the initial signal of the code pattern is always read first and not the account number printed above it. The distance $y$ between the lines L1 and L2 corresponds to the pitch or distance between two successive printing positions of a code pattern. The cylinder-shaped light conductors (see shaded circle) have tapered or flattened ends, which ensure an improvement of the pulse shape. Thus each photocell is placed, as it were, behind a slot having a width of 0.4 mm. and a length of 2 mm. The diameter of a dot is 1 mm. (see "DOT" under flattened end $fb$). FIG. 4 shows how the amplitude of the photocell signal depends on the position of the dot before the light conductor. If the dot is shifted in a vertical direction from the center, over a distance of ± 0.5 mm., it will still lie entirely in front of the light conductor and the signal amplitude will still attain about 80 percent of the maximum value. These limits are shown as the herringbone lines in FIG. 4. When moved horizontally past the arrangement of FIG. 3, a dot will always be perceived, either by photocells of the L1-group or by those of the 12L-group. It is also possible that a dot is detected by both groups. If e.g., a dot lies in the middle between the cells $fa$ and $fb$ of the line L1, it will be detected with certainty by the photocell $ff$ of the line L2.

II THE SELECTING CIRCUITS

Figure 3A:
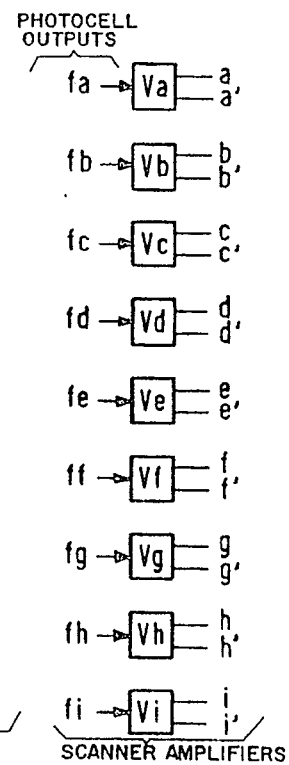
FIG. 3a is a schematic block diagram of the amplifiers connected to each of the photocells for each photocell position shown in FIG. 3, the two outputs from each amplifier being connected to the selecting circuit shown in FIG. 5.
Figure 5:
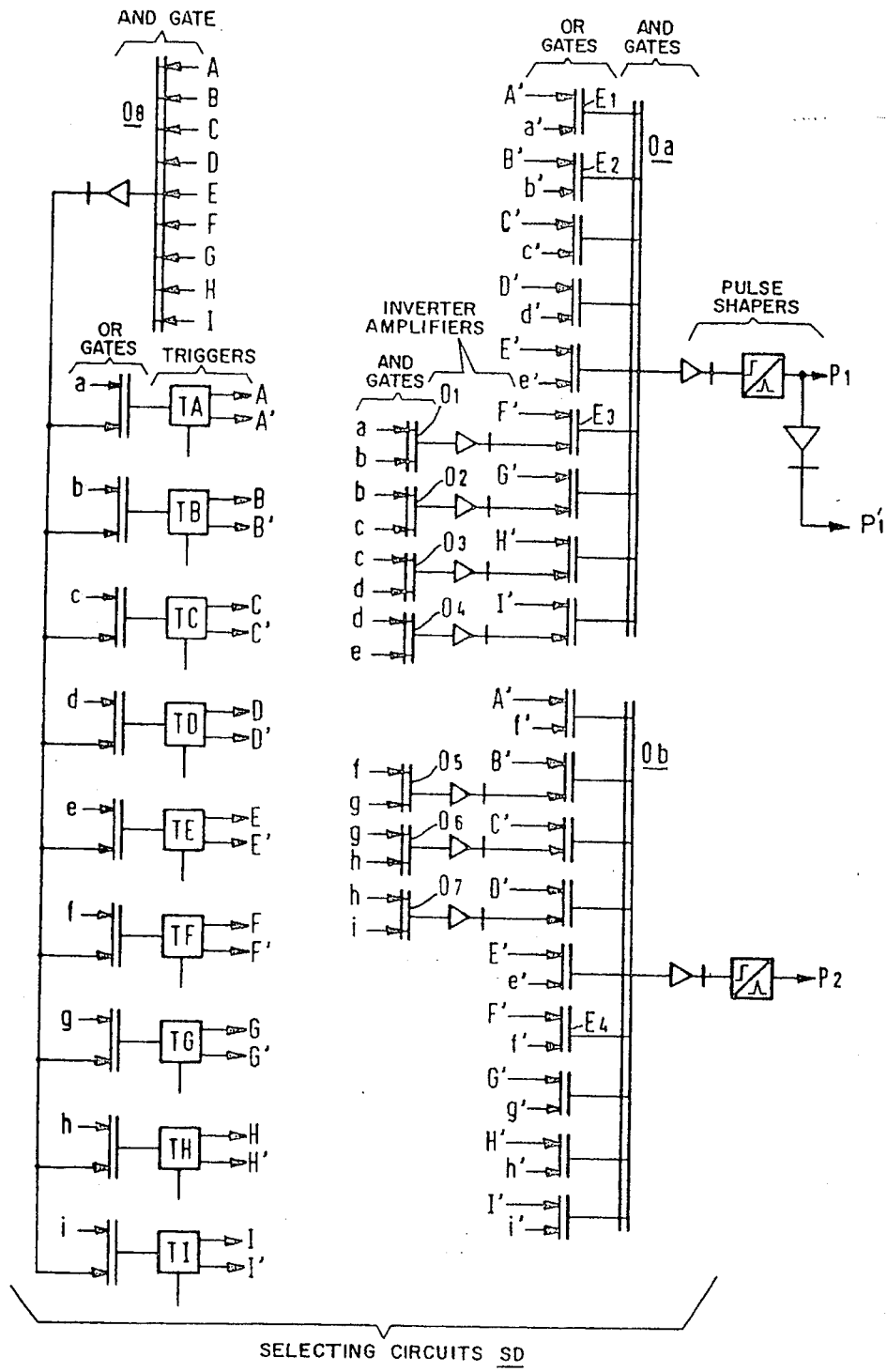

The signals delivered by the photocells $fa$ through $fi$ are amplified and limited in the circuits Va through Vi (FIG. 3a). The output terminals $a, a'$ through $i, i'$ of these amplifiers are connected to an automatic selecting circuit SD (see FIG. 5). This selection is carried out as follows:

As soon as one of the photocells of the L1-group perceives a dot, the associated trigger (TA through TE) is changed over, whereas all the other triggers are blocked. It is possible that a dot passes just in the middle between two light conductors. In that case none of the triggers TA through TE will be changed over and the dot will have to be detected by one of the photocells of the L2-group, namely one of the associated triggers TF through TI is then changed over.

Thus with respect to the scanning device, nine different positions of the first dot of the code pattern can be distinguished. Each of these positions is marked by a changeover of one of the triggers TA through TI. In each of the said nine positions one group of not more than three photocells is indicated, and only the signals of this group will be used for detecting the whole line of data on one document. By means of complex gate circuits Oa and Ob it is achieved that, one of the photocells of the L1-group perceiving a dot, a P1-pulse arises via the gate circuit Oa. Similarly, a P2-pulse will arise (via the gate circuit Ob), if one of the photocells of the L2-group perceives a dot. The choice of the photocells is carried out as follows:

Suppose the photocell $fb$ to be the first to perceive a dot. Then the trigger TB is changed over by the pulse $b$ from amplifier Vb (see FIGS. 3a and 8). Of the photocells located on the line L1 it is only the photocell $fb$ that provides the signal for further use, because the signals from the photocells $fa$ and $fc$ through $fe$ are blocked by the selecting device shown in FIG. 5. Thus, when the trigger TB has been changed over, only the AND-gate E2 of the complex gate circuit Oa will be unblocked by the output B' of the trigger TB. Each succeeding pulse appearing at the output terminal b' of the photocell amplifier Vb will produce a P1-pulse.

Figure 8:
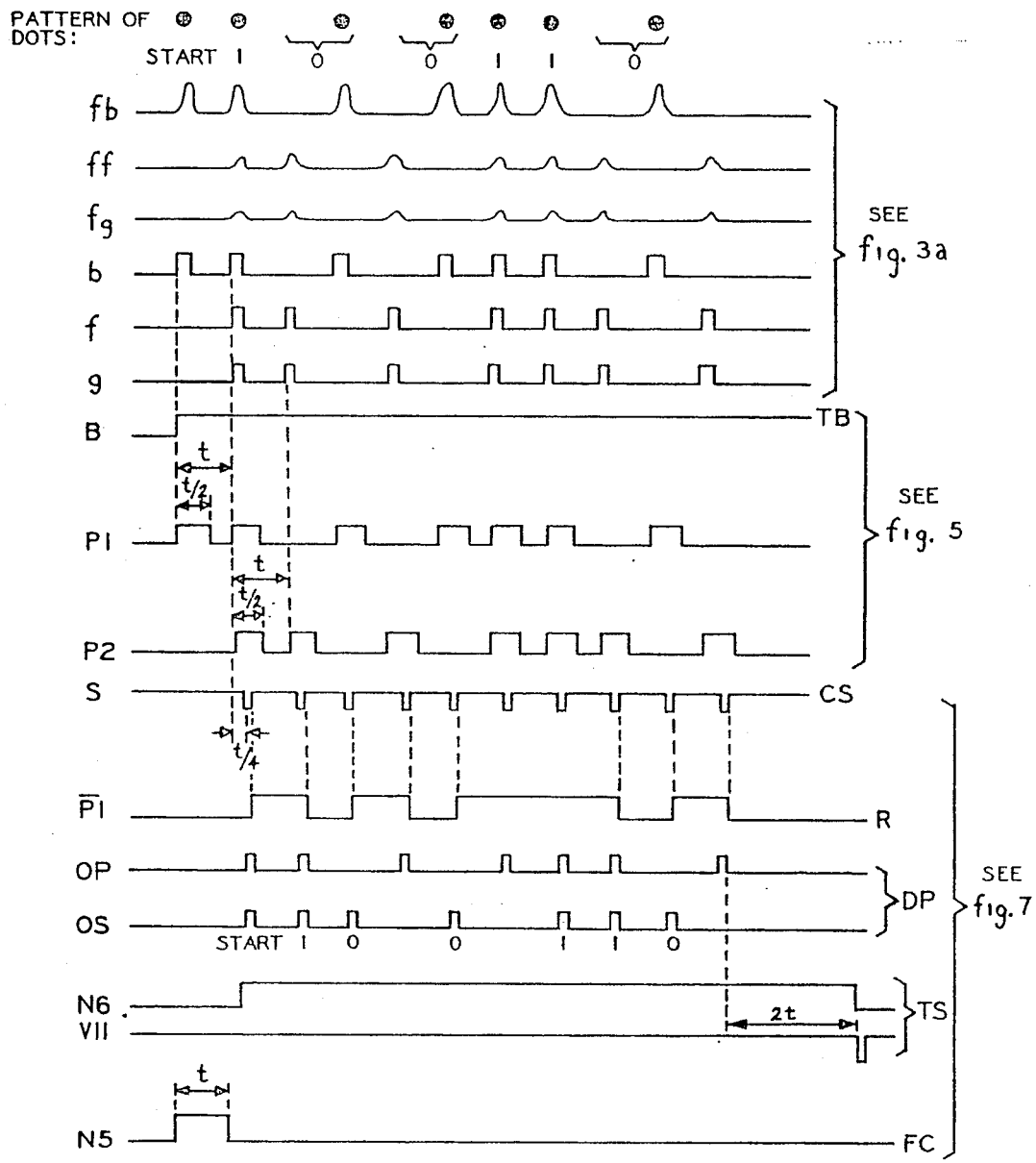

At the same time the changeover of the trigger TB causes, via the terminal B', an OR-gate O5 to be released, owing to which the signal delivered by the photocells $ff$ and $fg$ are also used; these signals will produce a P2-pulse (see FIG. 8). Consequently, there is a maximum of three photocells chosen, which affords an ample tolerance in the positions of dots of the code pattern can occupy. The selecting device is automatically adjusted afresh for every document and remains in the same state for the time when the document is scanned. Notably, this arrangement can suitably cope with a slanting position of a document or a code pattern with respect to the scanning device. If e.g., a dot passes between the photocells $fa$ and $fb$, so that there arise no pulses at the terminals $a$ and $b$, then the output terminal $f$ of the amplifier Vf delivers a pulse when the dot passes and the trigger TF is changed over. In that case the signals of the photocells $fa, fb$ and $ff$ are used, on the understanding that the signals appearing at the terminals $a$ and $b$ can produce a P1-pulse by activating the OR-gate O1 and the AND-gate E3 and that the signal appearing at the terminal $f$ can produce a p2-pulse by activating the AND-gate E4. If the time required for the document to cover a distance corresponding to the pitch of the element positions is equal to $t$, the duration of the pulses P1 and P2 will be $t/2$.

III THE PROCESSING CIRCUITS

Figure 6:
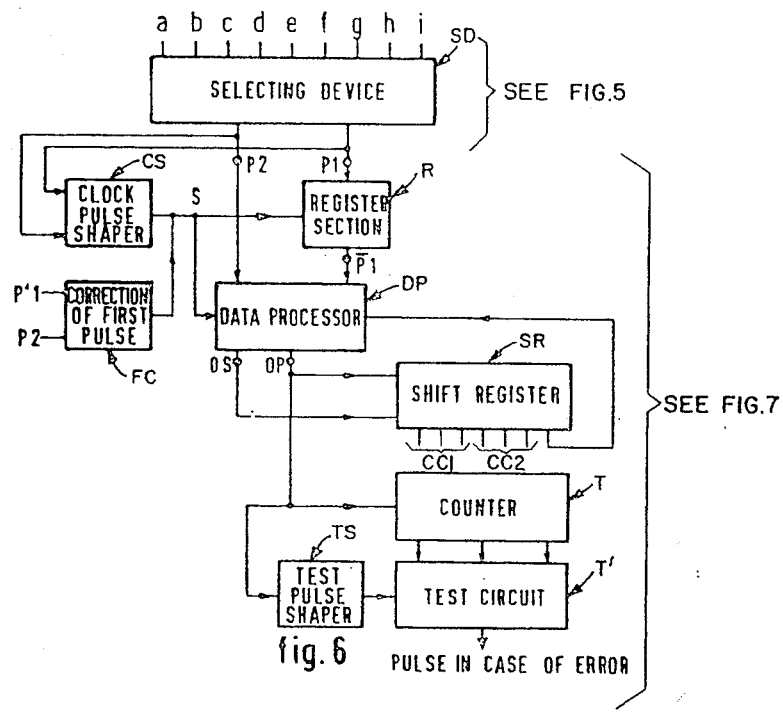

FIG. 6 is the block diagram of the device which handles the pulse P1 and P2. Of the pulses P1 and P2 appearing at the output terminals of the selecting circuit SD clock pulses S are formed in clock pulse shaper CS, for the distance between the photocells producing the pulses P1 and P2 is equal to the pitch of the elements to be scanned. If it is assumed that a dot is seen by one of the two groups of photocells on L1 or L2 (FIG. 3), clock pulses S will appear at regular intervals. Now the information contained in the P1 signal is delayed by an interval $t$ (one pitch) (see FIG. 8). This is done by connecting P1 to the input terminal of a register section. Thus the signal available at $\overline{P1}$ is the information appearing at P1 during the preceding clock pulse.

Then the signals $\overline{P1}$ and P2 are applied to the data processing device DP. By considering the signals $\overline{P1}$ and P2 simultaneously, the lines L1 and L2 of FIG. 3 can be made to coincide as it were, so that all the scanning light conductors can be regarded as lying on one line. The following combinations are possible:

| $\overline{P1}$ | P2 | $\overline{P1}$+P2 |
|---|---|---|
| 1 | 0 | 1 |
| 0 | 1 | 1 |
| 1 | 1 | 1 |
| 0 | 0 | 0 |

The value 1 in the table means that a dot has been perceived. Assuming that a dot is perceived either by one group or by both groups of photocells, it can be seen that $\overline{P1}$+P2=1 which means that the position read contains a dot. If $\overline{P1}$+P2=0, the position read presents a blank. This information is available at the output terminal (OP) of the data processor DP (see FIG. 8) and is supplied to a shift register consisting of seven sections. In the initial state all the shift register SR sections (see FIG. 7) contain the 0-value. The first dot of a code pattern causes the output terminal OP of the data processor DP to deliver 1-value information. After seven clock or shift pulses OS, this information is normally found in the last section of the shift register SR. The shift register SR is blocked then. A counter T determines the correct number of dots perceived and the contents of the counter T are checked at a given moment.

Figure 7:
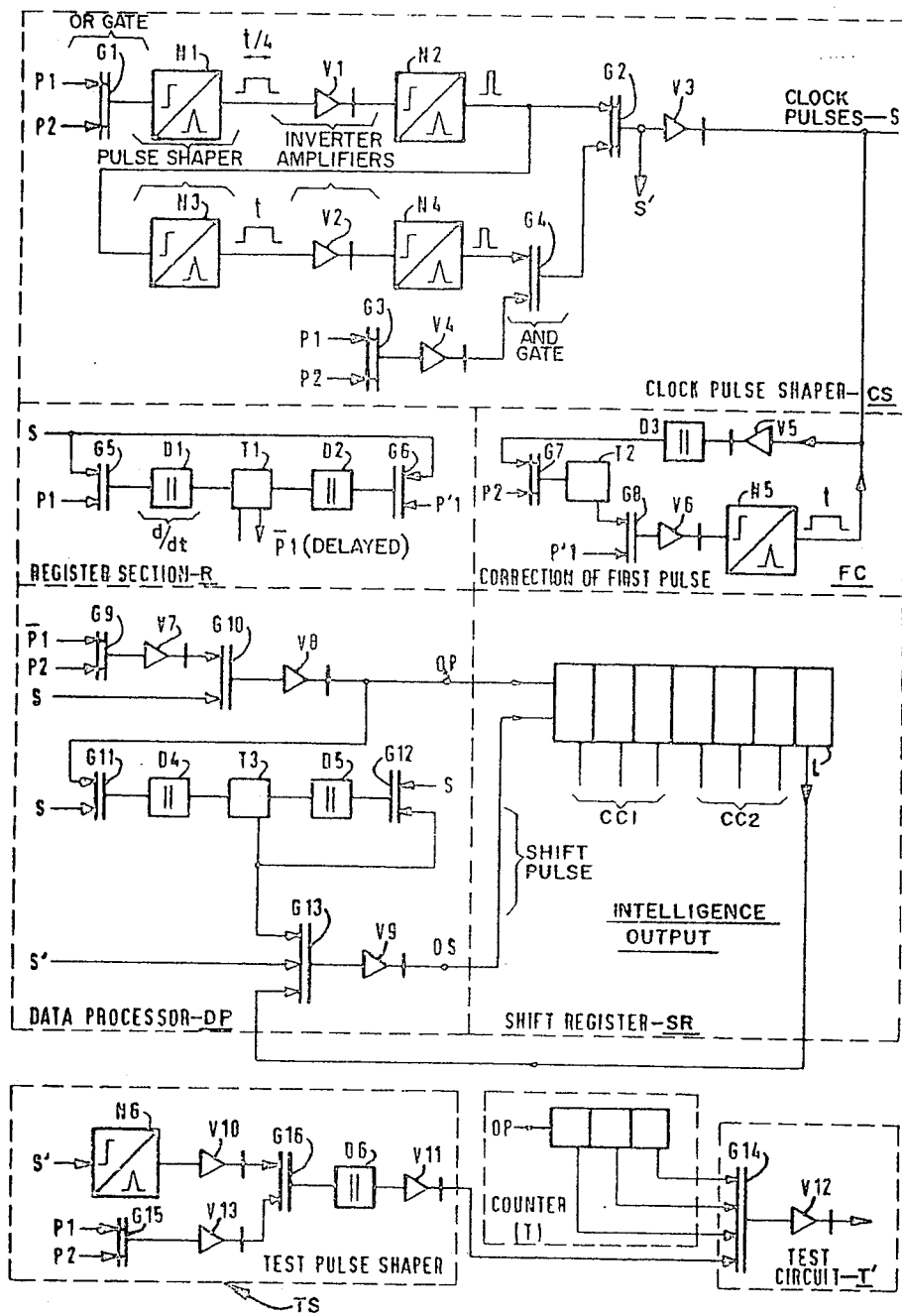
FIG. 7 is a more detailed schematic wiring diagram of all but the selecting device portion of the circuit shown in FIG. 6.

FIG. 7 is a more elaborated diagram of the circuit in FIG. 6. As soon as a pulse, including the start pulse from the start dot on the document, appears at one of the output terminals P1 or P2, indicating that a dot has been perceived, a pulse of the duration =t/4 is formed by the pulse shaping network N1 of the clock pulse shaper CS. From the trailing edge of this pulse the network N2 derives a short pulse, which can reach the output terminal as a clock pulse S via the OR-gate G2 and the amplifier V3. The pulses S appearing at this output terminal are the clock pulses. These clock pulses S are short, negative pulses, falling in the middle of the pulses P1 and P2 (see FIG. 8).

It is possible that a code pattern has such a position that only P1-pulse or P2-pulses arise. The passage of a blank (the first element of a logic "0") would not produce a clock pulse S in that case. The circuit is so adapted, however, that a clock pulse S will arise nevertheless, because a pulse arising at the terminal N2 causes at the same time a pulse to appear at the output terminal of N3. This network delivers a pulse of a duration =t. From the trailing edge of this pulse t, the network N4 forms a short pulse, which is passed as a clock pulse S, if the gate G4 is not blocked, i.e., if at neither of the terminals P1 and P2 a pulse appears, none of the photocells having perceived a dot.

At the end of the clock pulse S the information present at the terminals P1 and P'1 is transferred to the opposite ends of the register section R in FIG. 7 consisting of the AND-gates G5 and G6, the differentiating networks D1 and D2, and the trigger T1. So during each clock pulse S the output terminal P1 presents the information present at P1 during the preceding clock pulse S (see FIG. 8). In the data processor DP the information present at the two terminals P1 and P2 is combined into one signal appearing at the output terminal (OP). If a blank is found in a reading position (i.e., the line L2 in FIG. 3), both input terminals of the OR-gate G9 are negative, and consequently the terminal OP is also negative. If a dot is found in the reading position, the output terminal OP is always positive during a clock pulse S.

The information appearing at the terminal OP is shifted into the shift register SR. It is desirable to have the binary-coded information directly available at the output terminals of the shift register SR. This can be achieved by suppressing the clock pulse S (which acts as a shift pulse for the shift register) for the duration of one cycle, every time after 0-valve information has appeared at the output terminal OP (see FIG. 8). Since the logic value 0 is coded as a blank followed by a dot, the first element of the code signal 0 is shifted into the shift register SR, but the following second element via P2 is not transferred to this register SR. The adaptation of the clock pulses S to the shift pulses OS desired is also effected by the data processor DP. As soon as a blank has been detected, the output OP of amplifier V8 becomes negative. Consequently, the output terminal of the AND-gate G11 becomes negative, so that at the end of that pulse, the trigger T3 is changed over by means of the differentiating network D4. Only at the end of the next clock pulse is the trigger T3 restored to normal by means of the network D5 and the AND-gate G12. So the AND-gate G13 is blocked for the duration of one clock pulse S after the passage of a blank. Thus the output terminal of amplifier V9 from gate G13 supplies the desired shift pulses OS (see also FIG. 6). After seven shift pulses OS the output terminal L of the last shift register section becomes negative and blocks the gate G13, so that the contents of the shift register SR are blocked and then can be transferred as the two numbers desired via the conductors CC1 and CC2.

IV THE CHECKING CIRCUIT

The number of times that a positive pulse appears at the output terminal OP is equal to the number of dots perceived. This number of pulses is counted by the counter T, which must have counted seven pulses at the end of the scanning. The moment when the contents of the counter T are checked is determined by the test pulse shaper TS. At every clock pulse S' (the inverse of pulse S) the pulse shaping network N6 is started. The time constant of the pulses this network can deliver is 2t (see FIG. 8). Only an interruption of the regular succession of the clock pulses S can cause the network N6 to form a pulse of a duration =2t. If the gate G16 is not blocked a differentiating network D6 forms, at the end of this pulse, a pulse which, via amplifier V11, appears as a test pulse tp at its output terminal. The gate G16 is not blocked if no pulse appears at the terminals P1 and P2. During the test pulse tp the contents of the counter 7 are checked in the testing circuit TC by means of the AND-gate G14 and the amplifier V12.

Further there is a first pulse correcting circuit FC. As determined by the position of the code pattern to be scanned with respect to the reading device, the first dot can be perceived first by the first group of photocells on L1 or by the second group on L2. For the information to be recorded this must not make any difference.

The working of the circuit is such that, a first pulse appearing at the output terminal P1, the first clock pulse S is suppressed (see FIG. 8). Or, putting the same thing in other words: the first clock pulse S always appears when the first dot of the code pattern is in front of the second group of photocells on L2. A pulse delivered by P2 can change over the trigger T2. If a pulse appears at the terminal P'1, the output terminal of the AND-gate G8 becomes negative, if the trigger T2 has not been changed over yet. In that case the pulse shaping network N5 delivers a pulse of a duration =t, owing to which no clock pulse can arise. At the end of this pulse the trigger T2 is changed over by means of the differentiating network D3, so that the circuit is further blocked (see last wave form in FIG. 8).

While there is described above the observed principles of this invention in connection with specific apparatus, it is to be clearly understood that there may be many unobserved side effects which contribute substantially to the efficiency of this device and that this description is made only by way of example and not as a limitation to the scope of this invention.

I claim:

1. An apparatus for reading an octonal code of a predetermined number of dots in a code of dots and blanks in equally spaced positions in a line on a bearer, said apparatus comprising:
   1. a first and second row of photocells *fa–fi* parallel to each other and oblique to said line of dots and blanks, said rows being spaced corresponding to the distance between adjacent said positions for the information on said line on said bearer, and the area scanned by each of said photocells in one row overlaps the areas scanned by two adjacent photocells in the other row,
   2. means SD (TA through TI, Oa, Ob) connected to said photocells responsive to the first dot detected for selecting not more than two photocells in one row and one photocell in the other row which will be used for scanning said line for each bearer,
   3. means CS and RC (N1 through N4) connected to said selecting means generating clock pulses S timed according to said distance between said positions, and to start it when the second row of photocells is in the first dot scanning position so that the pulses from the second and succeeding dots and blanks detected are processed for detection as dots and blanks,
   4. means DP (G9, G10, T3) connected to said selecting means controlled by said clock pulses for processing information from said photocells during the scanning of each bearer, and
   5. means T, T', (G14) for comparing the number of dots detected on each bearer with a predetermined number whereby errors can be detected.

2. An apparatus according to claim 1 wherein said dots and blanks on said bearer comprises typewritten dots and spaces.

3. An apparatus according to claim 1 wherein said bearer is in a windowed envelope and said photocells read said code on said bearer through said window.

4. An apparatus according to claim 1 wherein said means for generating said clock pulses includes a pulse shaper (N1 through N4).

5. An apparatus according to claim 1 including means FC for preventing the start of said clock pulses until the time the first pulse scanned is positioned under the second row of said photocells.

6. An apparatus according to claim 1 wherein said processing means includes a shift register SR (L).

7. An apparatus according to claim 6 wherein said processing means includes a shift pulse generator T3, G13 (OS) controlled by said clock pulses for controlling said shift register.

8. An apparatus according to claim 6 including means for generating pulses (P) for controlling said processing means from said clock pulses and the pulses (P1) formed from the scanning by the first parallel row of photocells.

9. An apparatus according to claim 6 wherein said processing means includes means G9, G10 for generating pulses OP for said shift register corresponding to the pulses produced by the first parallel row of photocells delayed as if they had been produced by the second parallel row of photocells.

10. An apparatus according to claim 1 wherein said comparing means includes a counter circuit T.

11. An apparatus according to claim 10 wherein said comparing means includes a test pulse shaping circuit TS (N6, D6) for testing said counter a predetermined time (N6) after the last pulse is detected by said second row of photocells.

* * * * *

(P 169/136)

PO-1050
(5/69)

UNITED STATES PATENT OFFICE
CERTIFICATE OF CORRECTION

Patent No. 3,649,814      Dated March 14, 1972

Inventor(s) Arie Adriaan SPANJERSBERG

It is certified that error appears in the above-identified patent and that said Letters Patent are hereby corrected as shown below:

Column 1, line 47, after "machine" insert - - has no doubt about whether - -. Column 3, line 34, "12L" should read - - L2 - -. Column 4, line 9, "of" first occurence should read - - the - -; line 32, "pulse" should read - - pulses - -; line 41 after "section" insert - - R - -; line 61, "(OP)" should read - - OP - -; line 62, after "register" insert - - SR - -; line 63, after "tions" insert - - (see Fig. 7), after "register" delete "SR" and "sections" delete "(see"; line 64, delete "Fig. 7)". Column 5, line 9, "P1 - pulse" should read - - P1 - pulses - -; line 27, "In the data - - - -" should begin a new paragraph; line 40, "0-valve" should read - - 0-value - -; line 75 "S" should read - - S'- -. Column 6, line 6, "7" should read - - T - -; line 53, Claim 1 sub 3. "RC" should read - - FC - -.

Signed and sealed this 8th day of August 1972.

(SEAL)
Attest:

EDWARD M.FLETCHER,JR.      ROBERT GOTTSCHALK
Attesting Officer             Commissioner of Patents (P 169/136)

PO-1050
(5/69)

UNITED STATES PATENT OFFICE
CERTIFICATE OF CORRECTION

Patent No. 3,649,814           Dated September 25, 1972

Inventor(s) Arie Adriaan SPANJERSBERG

It is certified that error appears in the above-identified patent and that said Letters Patent are hereby corrected as shown below:

on the title page section [73] "Assignees" should read - - Assignee,- - after "de" insert - - Directeur-Generaal der Posterijen, Telegrafie en

Telefonie - -

Signed and sealed this 30th day of January 1973.

(SEAL)
Attest:

EDWARD M. FLETCHER, JR.
Attesting Officer

ROBERT GOTTSCHALK
Commissioner of Patents